(12) United States Patent
Han et al.

(10) Patent No.: US 12,287,153 B2
(45) Date of Patent: Apr. 29, 2025

(54) THERMAL ENERGY STORAGE SYSTEM FOR INCREASING EFFICIENCY OF CONTINUOUS COLD WATER SUPPLY DEVICE FOR DATA CENTER SERVER

(71) Applicant: FT Energy, Ansan-si (KR)

(72) Inventors: Jae Yeon Han, Ansan-si (KR); Sung Gun Kwon, Seoul (KR)

(73) Assignee: FT Energy, Ansan-si (KR)

( * ) Notice: Subject to any disclaimer, the term of this patent is extended or adjusted under 35 U.S.C. 154(b) by 230 days.

(21) Appl. No.: 18/171,057

(22) Filed: Feb. 17, 2023

(65) Prior Publication Data

US 2024/0280330 A1 Aug. 22, 2024

(51) Int. Cl.
*F28D 20/00* (2006.01)
*F28D 21/00* (2006.01)

(52) U.S. Cl.
CPC .. *F28D 20/0039* (2013.01); *F28D 2020/0069* (2013.01); *F28D 2020/0082* (2013.01); *F28D 2021/0028* (2013.01)

(58) Field of Classification Search
CPC ......... F28D 20/0039; F28D 2020/0082; F28D 2020/0069; F28D 2021/0028; F24F 5/0017; F24H 9/133; F24H 9/04; F24H 15/225; F24D 2220/08
See application file for complete search history.

(56) References Cited

U.S. PATENT DOCUMENTS

2018/0231258 A1* 8/2018 Armstrong ............ F24H 9/2021

FOREIGN PATENT DOCUMENTS

| JP | 08303976 A | 11/1996 | |
|----|------------|---------|---|
| JP | 2007147093 A | 6/2007 | |
| JP | 2013213624 A | 10/2013 | |
| KR | 102235847 B1 * | 4/2021 | ............ F25D 17/02 |
| KR | 102424334 B1 | 7/2022 | |

OTHER PUBLICATIONS

Pdf is translation of foreign reference KR 102235847 B1 (Year: 2021).*

* cited by examiner

*Primary Examiner* — Len Tran
*Assistant Examiner* — Kamran Tavakoldavani
(74) *Attorney, Agent, or Firm* — Finch & Maloney PLLC (57) ABSTRACT

A thermal energy storage system includes: a thermal energy storage having an upper space for storing hot water and having a lower space for storing cold water, in which the hot water and the cold water are stratified; an upper diffuser located in the upper space; and a lower diffuser located in the lower space, wherein the thermal energy storage includes: a body having a cylindrical shape and having a central axis arranged parallel to a ground; a first dome part having a dome shape and configured to seal open one side of the body; a second dome part having a dome shape and configured to seal an open opposite side of the body; and a plurality of separation plates spaced apart from each other in a vertical direction within the body.

4 Claims, 11 Drawing Sheets

FIG. 14

THERMAL ENERGY STORAGE SYSTEM FOR INCREASING EFFICIENCY OF CONTINUOUS COLD WATER SUPPLY DEVICE FOR DATA CENTER SERVER

BACKGROUND OF THE INVENTION

1. Field of the Invention

The present invention relates to a thermal energy storage system, and more particularly, to a thermal energy storage system capable of increasing efficiency of a continuous cold water supply device for a data center server.

2. Description of the Related Art

A data center refers to a facility that requires air conditioning at a constant temperature, and a back-up device has been provided together with the data center because an air conditioning system has to operate continuously without stopping even upon a power failure.

Figure 1:
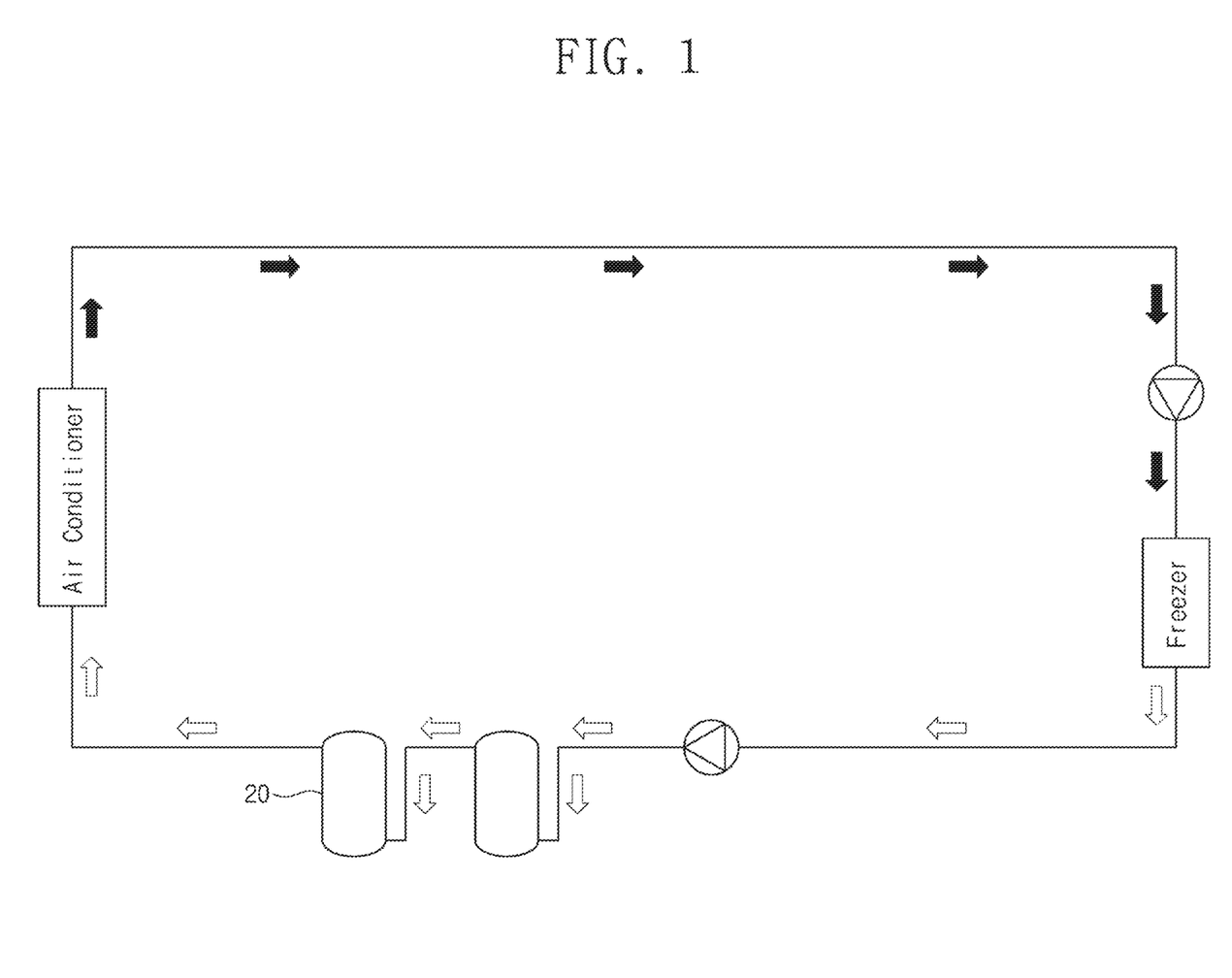
FIG. 1 is a view showing a back-up device for air-conditioning a data center according to the related art.

FIG. 1 is a view showing a continuous cold water supply device for a data center server according to the related art. According to the related art, a buffer tank 20 has been mainly installed in the back-up device. However, since it is not easy for the buffer tank to predict a suppliable time (back-up time) at which cold water is supplied at a constant design temperature by mixing hot water with the cold water, the number of buffer tanks has been increased, or a buffer tank having a large capacity has been installed. Immediately after recovery from the power failure, the hot water filled up in the buffer tank may pass through an air conditioner and return to a freezer. In this case, the hot water other than the cold water may be supplied to the air conditioning system of the data center for a predetermined time. In addition, upon an initial operation of the freezer after the recovery from the power failure, a temperature of the cold water supplied from the freezer may be higher than a design temperature, resulting in an inconsistent air conditioning temperature of the data center.

SUMMARY OF THE INVENTION

To solve the problems described above, an object of the present invention is to provide a thermal energy storage system in which: thermal storage efficiency of a thermal energy storage for a data center may be increased, and a high-efficiency distributor capable of predicting a back-up time may be designed to stratify hot water and cold water so as to minimize mixing of the hot water and the cold water, so that the thermal storage efficiency may be improved; a shape of a distributor may be changed to allow the cold water stored in the thermal energy storage to be used as much as possible, and a position of the distributor may be designed to be changeable, so that the thermal storage efficiency of the thermal energy storage may be further increased; and a supply line may be additionally provided to allow the cold water to be supplied from the thermal energy storage for a predetermined time even upon an initial operation of a freezer immediately after recovery from a power failure, so that water having a temperature that is higher than a design temperature may be prevented from being supplied to an air conditioner, and thus an air conditioning system of the data center may continuously operate more stably.

In addition, an object of the present invention is to provide a thermal energy storage system in which water supplied into a thermal energy storage may uniformly reach each region inside the thermal energy storage.

According to the present invention, a thermal energy storage system includes: a thermal energy storage having an upper space for storing hot water and having a lower space for storing cold water, in which the hot water and the cold water are stratified; an upper distributor located in the upper space and configured to suck the hot water; and a lower distributor located in the lower space and configured to supply the cold water, wherein the thermal energy storage includes: a body having a cylindrical shape and having a central axis arranged in a first axis direction that is parallel to a ground; a first dome part having a hemispherical shape and configured to seal open one side of the body; and a second dome part having a hemispherical shape and configured to seal an open opposite side of the body, and each of the upper distributor and the lower distributor has a predetermined length in the first axis direction and includes distribution holes formed in a surface facing an inner surface of the body.

In addition, each of the upper distributor and the lower distributor may include a first region that is adjacent to the first dome part, a second region that is adjacent to the second dome part, and a third region located between the first region and the second region, and each of distribution holes formed in the first region and the second region may have a larger size than a distribution hole formed in the third region.

In addition, the distribution holes may include: a first distribution hole; a second distribution hole located on one side of the first distribution hole while being spaced apart from the first distribution hole by a predetermined distance in a second axis direction that is perpendicular to the first axis direction; and a third distribution hole located on an opposite side of the first distribution hole while being spaced apart from the first distribution hole by a predetermined distance in the second axis direction, and each of the second distribution hole and the third distribution hole may have a larger size than the first distribution hole.

In addition, each of the upper distributor and the lower distributor may include: a first distribution pipe having a predetermined length, having a length direction arranged in the first axis direction, and including first distribution holes formed in a surface of the first distribution pipe facing an inner surface of the body; a second distribution pipe located on one side of the first distribution pipe in a second axis direction that is perpendicular to the first axis direction, arranged parallel to the first distribution pipe, and including second distribution holes formed in a surface of the second distribution pipe facing the inner surface of the body; a third distribution pipe located on an opposite side of the first distribution pipe in the second axis direction, arranged parallel to the first distribution pipe, and including third distribution holes formed in a surface of the third distribution pipe facing the inner surface of the body; a first connection pipe adjacent to the first dome part and configured to connect one ends of the first to third distribution pipes to each other; and a second connection pipe adjacent to the second dome part and configured to connect opposite ends of the first to third distribution pipes to each other.

In addition, the second distribution pipe and the third distribution pipe may be located at a lower height than the first distribution pipe.

According to the thermal energy storage system of the present invention, the hot water introduced into the upper distributor and the cold water stored in the thermal energy storage may be stratified to minimize a mixing flow rate so that thermal storage efficiency of the thermal energy storage can be increased, and the cold water stored in the thermal energy storage may be sent to the air conditioner at a maximum flow rate at the design temperature upon an emergency operation such as a power failure so that an increase in a temperature of the data center can be minimized.

In addition, according to the thermal energy storage system of the present invention, the thermal storage efficiency can be maximized through the upper distributor and the lower distributor, and the cold water may be supplied through the thermal energy storage for a predetermined time upon an initial reactivation operation of the freezer after the recovery from the power failure so that the air conditioning system of the data center can stably and continuously operate at a constant temperature.

DETAILED DESCRIPTION OF THE INVENTION

Hereinafter, exemplary embodiments of the present invention will be described in detail with reference to the accompanying drawings. However, the technical idea of the present invention is not limited to the embodiments described herein, but may be realized in different forms. The embodiments introduced herein are provided to sufficiently deliver the idea of the present invention to those skilled in the art so that the disclosed contents may become thorough and complete.

When it is mentioned in the present disclosure that one element is on another element, it means that one element may be directly formed on another element, or a third element may be interposed between one element and another element. Further, in the drawings, thicknesses of films and regions are exaggerated for effective description of the technical contents.

In addition, in various embodiments of the present disclosure, the terms such as first, second, and third are used to describe various elements, but the elements are not limited by the terms. The terms are used only to distinguish one element from another element. Therefore, an element mentioned as a first element in one embodiment may be mentioned as a second element in another embodiment. The embodiments described and illustrated herein include their complementary embodiments. Further, the term "and/or" used herein is used to include at least one of the elements enumerated before and after the term.

As used herein, an expression in a singular form includes a meaning of a plural form unless the context clearly indicates otherwise. Further, the terms such as "including" and "having" are intended to designate the presence of features, numbers, steps, elements, or combinations thereof described in the present disclosure, and shall not be construed to preclude any possibility of the presence or addition of one or more other features, numbers, steps, elements, or combinations thereof. In addition, the term "connection" used herein is used to include both indirect and direct connections of a plurality of elements.

Further, in the following description of the present invention, detailed descriptions of known functions or configurations incorporated herein will be omitted when they may make the gist of the present invention unnecessarily unclear.

Figure 2:
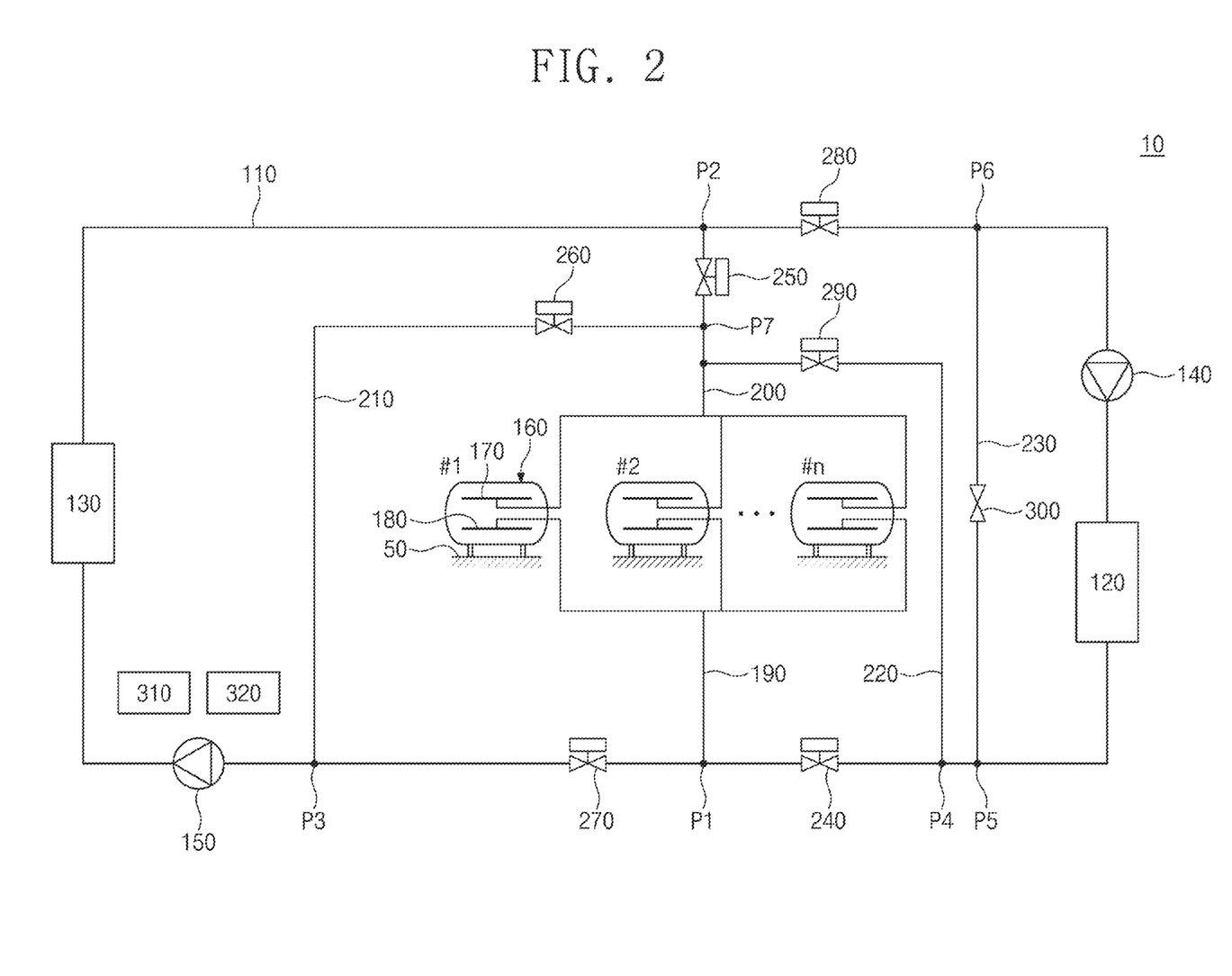
FIG. 2 is a view showing a thermal energy storage system according to an embodiment of the present invention.
Figure 3:
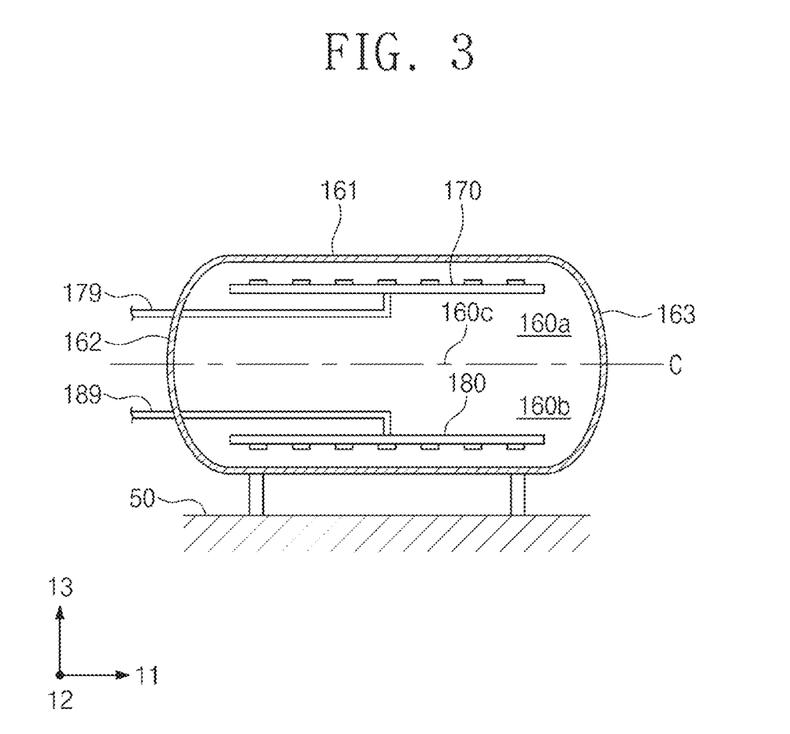
FIG. 3 is a view showing a thermal energy storage, an upper distributor, and a lower distributor of FIG. 2.

FIG. 2 is a view showing a thermal energy storage system according to an embodiment of the present invention, and FIG. 3 is a view showing a thermal energy storage, an upper distributor, and a lower distributor of FIG. 2.

Referring to FIGS. 2 and 3, a thermal energy storage system 10 may include a circulation line 110, a freezer 120, an air conditioner 130, a first pump 140, a second pump 150, a thermal energy storage 160, an upper distributor 170, a lower distributor 180, first to fifth supply lines 190 to 230, first to seventh valves 240 to 300, an auxiliary power supply unit 310, and a control unit 320.

The circulation line 110 may be provided as a closed loop line through which water may circulate.

The freezer 120 may be installed on the circulation line 110, and configured to operate by a power supplied from an external power supply unit (not shown). The freezer 120 may cool water circulating along the circulation line 110.

The air conditioner 130 may be installed on the circulation line 110, and configured to cool an external system (not shown) through heat exchange with cold water flowing along the circulation line 110. According to an embodiment, the external system may be a data center.

The first pump 140 may be installed on the circulation line 110 in a section between the air conditioner 130 and the freezer 120, and configured to generate a pressure so that the water may be supplied from the air conditioner 130 to the freezer 120.

The second pump 150 may be installed on the circulation line 110 in a section between the freezer 120 and the air conditioner 130, and configured to generate a pressure so that the water may be supplied from the freezer 120 to the air conditioner 130.

The thermal energy storage 160 may provide a space in which the water may be stored. An inside of the thermal energy storage 160 may be divided into an upper space 160a and a lower space 160b based on a central axis C that is parallel to a ground 50, in which hot water may be stored in the upper space 160a, and cold water may be stored in the lower space 160b. The hot water and the cold water may be stratified with a boundary layer 160c interposed therebetween. The hot water and the cold water may be maintained at a temperature that is lower than a room temperature. The cold water may be maintained at a lower temperature than the hot water. According to the embodiment, the hot water may be at a temperature of about 15° C., and the cold water may be at a temperature of about 5° C. The thermal energy storage 160 may be provided as a sealed container.

The thermal energy storage 160 may include a body 161, a first dome part 162, and a second dome part 163.

The body 161 may be a cylinder having a predetermined length, and may have open both sides. The body 161 may have a central axis C arranged in a first axis direction 11 that is parallel to the ground 50. Hereinafter, for convenience of description, when viewed in a top view, a direction that is perpendicular to the first axis direction 11 will be referred to as a second axis direction 12, and a direction that is perpendicular to the first and second axis directions 11 and 12 will be referred to as a third axis direction 13.

The first dome part 162 may have a convex hemispherical shape, and may be configured to seal open one side of the body 161. The second dome part 163 may have a convex hemispherical shape, and may be configured to seal an open opposite side of the body 161.

The upper distributor 170 may be located in the upper space 160a of the thermal energy storage 160, and configured to discharge the hot water stored in the upper space 160a to an outside or supply the water circulating along the circulation line 110 to the upper space 160a. The upper distributor 170 may be connected to an upper pipe 179. Distribution holes 171, 172, and 173 may be formed in a surface of the upper distributor 170 facing an inner surface of the body 161. The distribution holes 171, 172, and 173 may have a circular shape or various polygonal shapes such as a triangular shape, a square shape, and a rectangular shape.

The lower distributor 180 may be located in the lower space 160b of the thermal energy storage 160, and configured to discharge the cold water stored in the lower space 160b to the outside or supply the water circulating along the circulation line 110 to the lower space 160b. The lower distributor 180 may be connected to a lower pipe 189. Distribution holes 181, 182, and 183 may be formed in a surface of the lower distributor 180 facing the inner surface of the body 161.

The upper distributor 170 and the lower distributor 180 may have the same structure. Hereinafter, a specific structure of the upper distributor 170 will be described for illustrative purposes.

Figure 4:
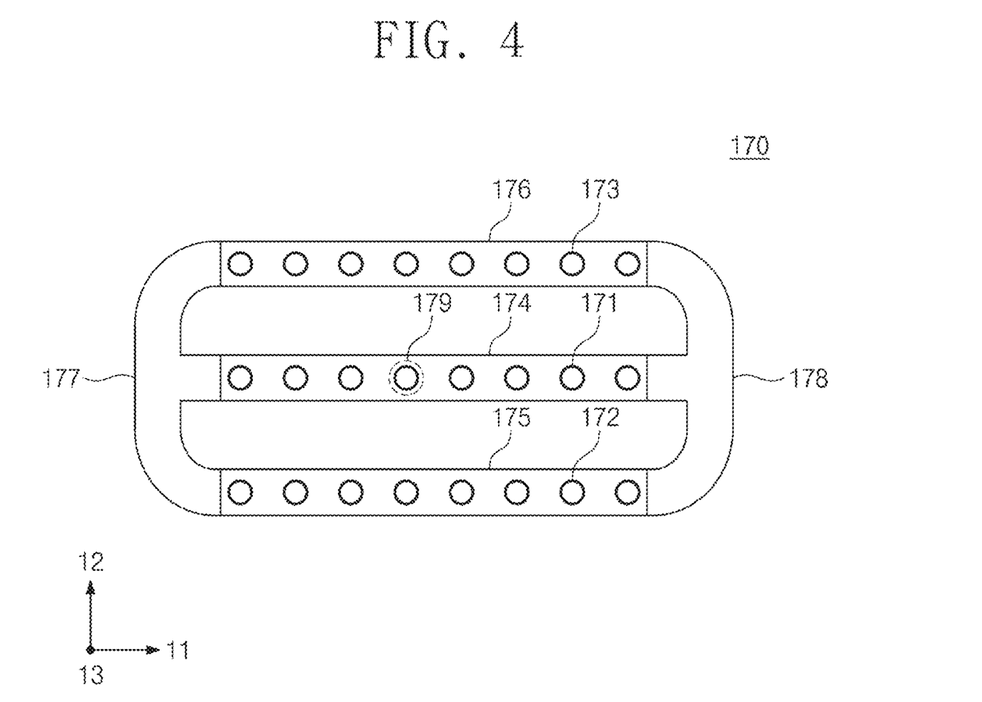
FIG. 4 is a plan view showing the upper distributor.
Figure 5:
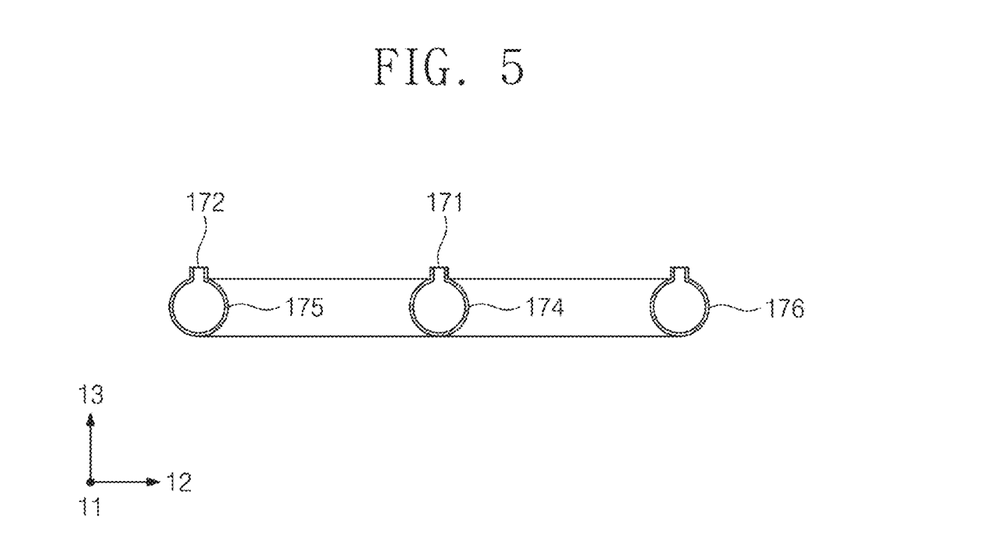
FIG. 5 is a sectional view showing the upper distributor.

FIG. 4 is a plan view showing the upper distributor, and FIG. 5 is a sectional view showing the upper distributor.

Referring to FIGS. 4 and 5, the upper distributor 170 may include a first distribution pipe 174, a second distribution pipe 175, a third distribution pipe 176, a first connection pipe 177, and a second connection pipe 178.

The first distribution pipe 174 may have a predetermined length, and may have a length direction arranged in the first axis direction 11. The first distribution pipe 174 may be located on the same line as the central axis C of the body 161 in the third axis direction 13. The first distribution pipe 174 may be connected to the upper pipe 179. First distribution holes 171 may be formed in a surface of the first distribution pipe 174 facing the inner surface of the body 161. The first distribution holes 171 may be formed at an upper end of the first distribution pipe 174. The first distribution holes 171 may be formed at a predetermined interval in the length direction of the first distribution pipe 174.

According to one embodiment, the first distribution holes 171 formed in regions of the first distribution pipe 174, respectively, may have the same size.

According to another embodiment, the first distribution holes 171 may have mutually different sizes according to the region of the first distribution pipe 174. Hereinafter, for convenience of description, in the first distribution pipe 174, a region that is adjacent to the first dome part 162 will be referred to as a first region, a region that is adjacent to the second dome part 163 will be referred to as a second region, and a region between the first region and the second region will be referred to as a third region.

Figure 6:
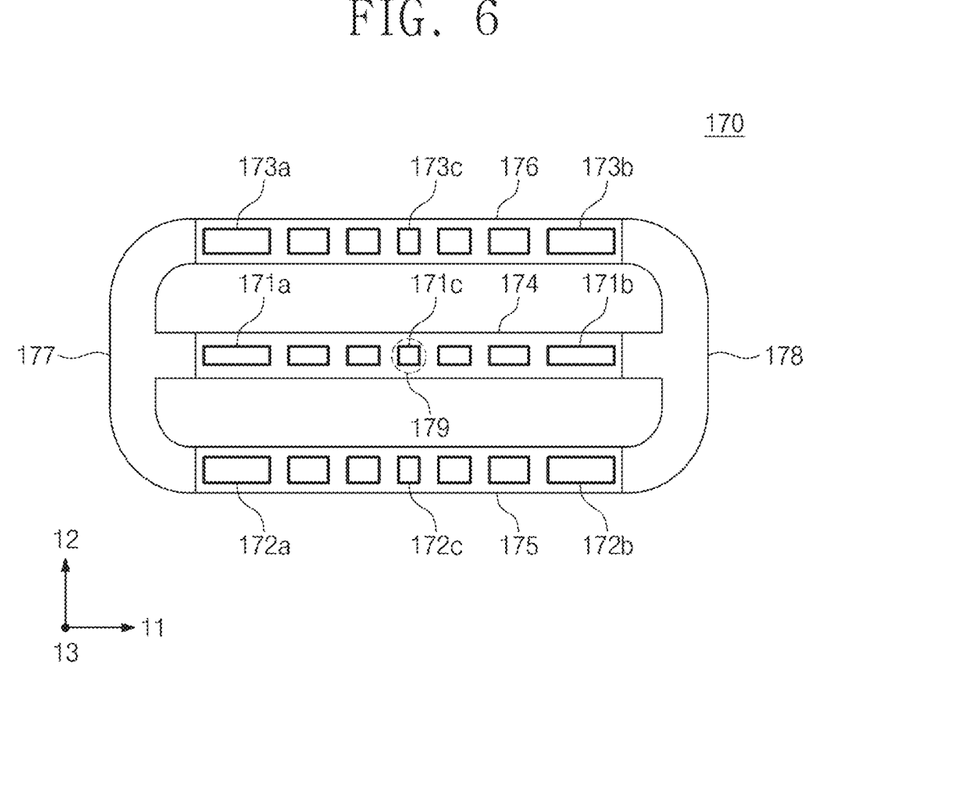
FIG. 6 is a plan view showing an upper distributor according to another embodiment of the present invention.

FIG. 6 is a plan view showing an upper distributor according to another embodiment of the present invention.

Referring to FIG. 6, first distribution holes 171a formed in the first region and first distribution holes 171b formed in the second region may have a larger size than first distribution holes 171c formed in the third region. The first distribution holes 171 may have a size that gradually increases from the third region to the first and second regions.

The second distribution pipe 175 may have the same length as the first distribution pipe 174, and may be located on one side of the first distribution pipe 174 in the second axis direction 12. Second distribution holes 172 may be formed in a surface of the second distribution pipe 175 facing the inner surface of the body 161. The second distribution holes 172 may be formed at an upper end of the second distribution pipe 175. The second distribution holes 172 may be formed at a predetermined interval in a length direction of the second distribution pipe 175. The second distribution holes 172 may have the same size as the first distribution holes 171 located on the same line in the second axis direction 12. Alternatively, the second distribution holes 172 may have a larger size than the first distribution holes 171 located on the same line in the second axis direction 12.

According to one embodiment, as shown in FIG. 4, the second distribution holes 172 formed in regions of the second distribution pipe 175, respectively, may have the same size.

According to another embodiment, as shown in FIG. 6, the second distribution holes 172 may have mutually different sizes according to the region of the second distribution pipe 175. Second distribution holes 172a formed in a first region of the second distribution pipe 175 and second distribution holes 172b formed in a second region of the second distribution pipe 175 may have a larger size than second distribution holes 172c formed in a third region of the second distribution pipe 175. The second distribution holes 172 may have a size that gradually increases from the third region to the first and second regions.

The third distribution pipe 176 may have the same length as the first distribution pipe 174, and may be located on an opposite side of the first distribution pipe 174 in the second axis direction 12. Third distribution holes 173 may be formed on a surface of the third distribution pipe 176 facing the inner surface of the body 161. The third distribution holes 173 may be formed at an upper end of the third distribution pipe 176. The third distribution holes 173 may be formed at a predetermined interval in a length direction of the third distribution pipe 176. The third distribution holes 173 may have the same size as the second distribution holes 172.

According to one embodiment, as shown in FIG. 4, the third distribution holes 173 formed in regions of the third distribution pipe 176, respectively, may have the same size.

According to another embodiment, as shown in FIG. 6, the third distribution holes 173 may have mutually different sizes according to the region of the third distribution pipe 176. Third distribution holes 173*a* formed in a first region of the third distribution pipe 176 and third distribution holes 173*b* formed in a second region of the third distribution pipe 176 may have a larger size than third distribution holes 173*c* formed in a third region of the third distribution pipe 176. The third distribution holes 173 may have a size that gradually increases from the third region to the first and second regions.

The first connection pipe 177 may be adjacent to the first dome part 162, and configured to connect one ends of the first to third distribution pipes 174 to 176 to each other.

The second connection pipe 178 may be adjacent to the second dome part 163, and configured to connect opposite ends of the first to third distribution pipes 174 to 176 to each other.

The water supplied through the upper pipe 179 may move to both ends of the first distribution pipe 174, may pass through the first connection pipe 177 and the second connection pipe 178, and may be introduced into the second distribution pipe 175 and the third distribution pipe 176. In this process, the water may be supplied into the thermal energy storage 160 through the first to third distribution holes 171 to 173.

Figure 7:
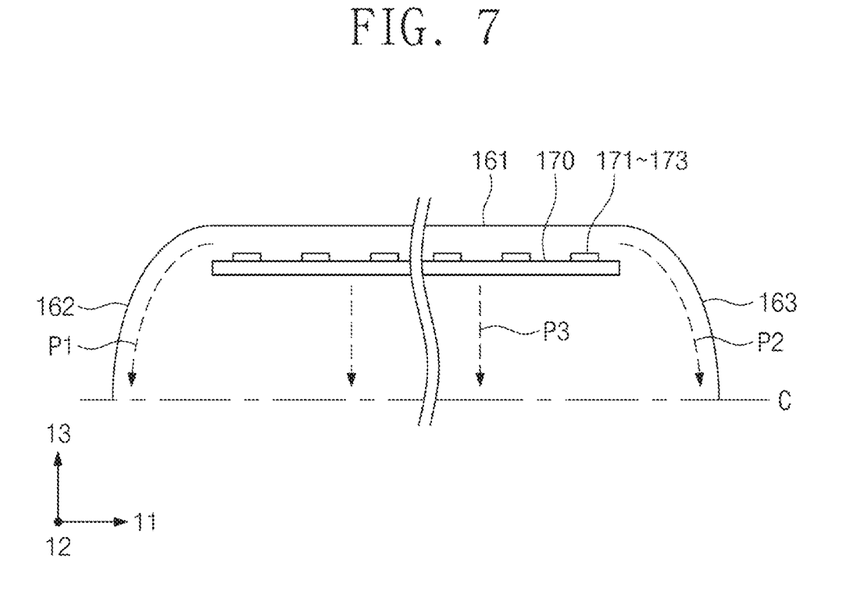
FIGS. 7 and 8 are views showing flows of water supplied through the upper distributor within the thermal energy storage, respectively.
Figure 8:
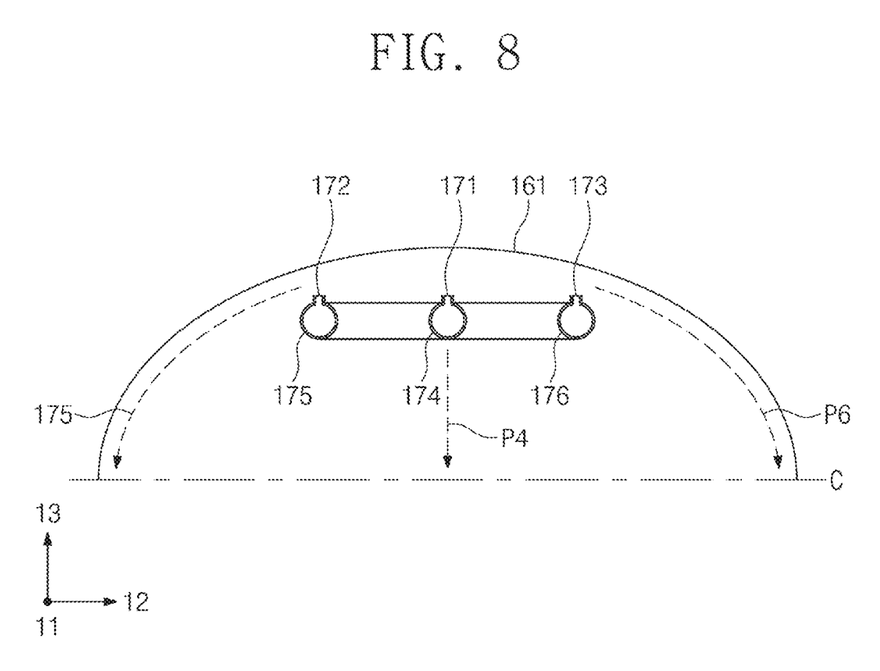
Figure 9:
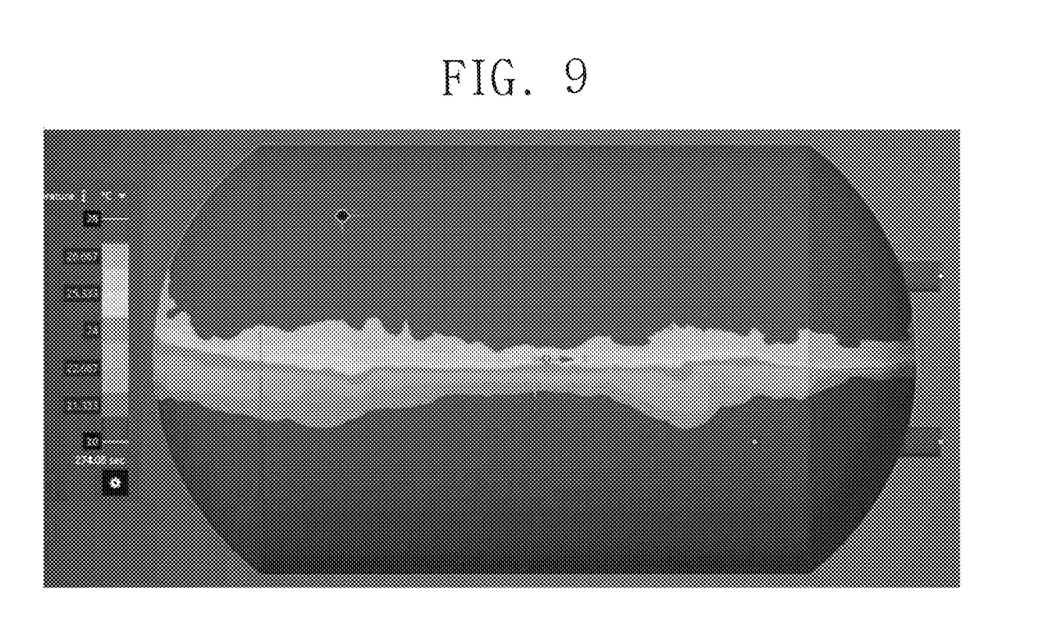
FIG. 9 is a view showing a uniform temperature distribution of hot water and cold water within the thermal energy storage according to the embodiment of the present invention.

FIGS. 7 and 8 are views showing flows of water supplied through the upper distributor within the thermal energy storage, respectively, and FIG. 9 is a view showing a uniform temperature distribution of hot water and cold water within the thermal energy storage according to the embodiment of the present invention.

First, referring to FIG. 7, when viewed in a plan view defined by a first axis 11 and a third axis 13, water supplied from the first region and the second region, which are adjacent to the first dome part 162 and the second dome part 163, respectively, among the regions of the upper distributor 170 may move in curved paths P1 and P2 along an inner surface of the first dome part 162 and an inner surface of the second dome part 163 so as to reach a central region C of the thermal energy storage 160. Meanwhile, water supplied from the third region of the upper distributor 170 may move substantially in a straight path P3 so as to reach the central region of the thermal energy storage 160.

Since a water movement path is longer in an edge region of the thermal energy storage 160 than in a middle region of the thermal energy storage 160 (P1, P2>P3), when water of the same flow rate is supplied, the water in the middle region may first reach the central region C of the thermal energy storage 160. Such a flow of the water may prevent the boundary layer of the hot water and the cold water from being formed with uniform temperature distribution.

In order to solve the above problem, according to the present invention, the distribution holes 171 to 173 in the regions of the upper distributor 170 may have mutually different sizes. In detail, the distribution holes 171*a* to 173*a* and 171*b* to 173*b* formed in the first region and the second region may have a larger size than the distribution holes 171*c* to 173*c* formed in the third region. Accordingly, water of a large flow rate may be supplied in the first and second regions of the upper distributor 170, and water of a relatively low flow rate may be supplied in the third region of the upper distributor 170. A relatively fast flow velocity may be formed in the edge region of the thermal energy storage 160 in which water of a large flow rate is supplied, and a relatively slow flow velocity may be formed in the middle region of the thermal energy storage 160 in which water of a small flow rate is supplied. Accordingly, a time required for the water in the edge region of the thermal energy storage 160 to reach the central region C of the thermal energy storage 160 and a time required for the water in the middle region of the thermal energy storage 160 to reach the central region C of the thermal energy storage 160 may be almost equal to each other, so that the boundary layer of the hot water and the cold water may be formed with the uniform temperature distribution as shown in FIG. 9.

Referring to FIG. 8, water supplied from the first distribution pipe 174 may flow in a straight path P4, and water supplied from the second distribution pipe 175 and the third distribution pipe 176 may flow in curved paths P5 and P6 along a wall surface of the body 161. Accordingly, a movement path of the water supplied from the second and third distribution pipes 175 and 176 may be longer than a movement path of the water supplied from the first distribution pipe 174 (P5, P6>P4).

When water of the same flow rate is supplied from the first to third distribution pipes 174 to 176, the water in the middle region in which the movement path P4 is relatively short may reach the central region C of the thermal energy storage 160 early. Such a difference in a reaching time of the water may prevent the boundary layer of the hot water and the cold water from being formed with the uniform temperature distribution.

In order to solve the above problem, according to the present invention, the distribution holes 171 to 173 formed in the first to third distribution pipes 174 to 176 may have mutually different sizes. The second and third distribution holes 172 and 173 may have a larger size than the first distribution holes 171. Accordingly, a flow rate of the water supplied from the second and third distribution pipes 175 and 176 may be greater than a flow rate of the water supplied from the first distribution pipe 174, so that a time required for water to reach the central region C of the thermal energy storage 160 may be shortened.

As described above, according to the present invention, the time required for the water in the edge region of the thermal energy storage 160 to reach the central region of the thermal energy storage 160 and the time required for the water in the middle region of the thermal energy storage 160 to reach the central region of the thermal energy storage 160 may be equal to each other, so that the boundary layer of the hot water and the cold water may be formed with the uniform temperature distribution.

Figure 10:
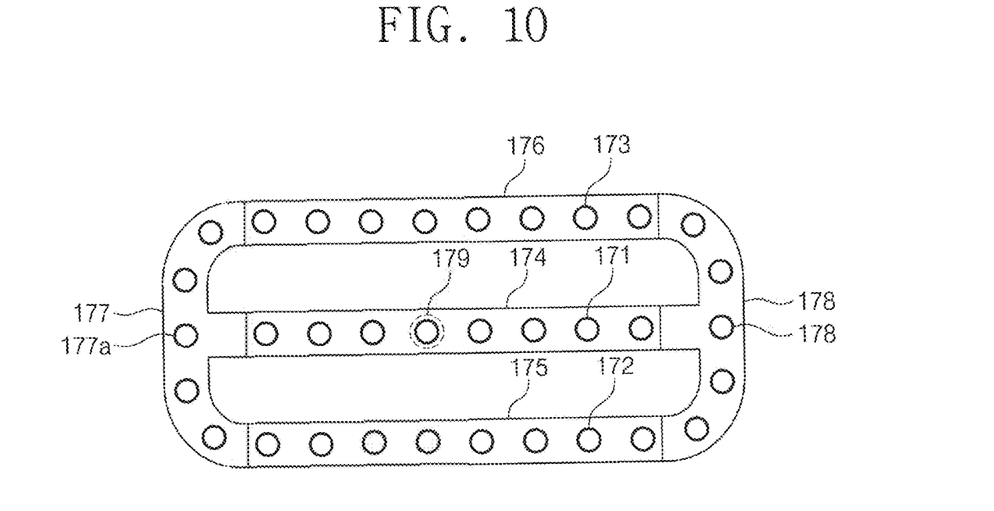
FIG. 10 is a plan view showing an upper distributor according to still another embodiment of the present invention.

FIG. 10 is a plan view showing an upper distributor according to still another embodiment of the present invention.

Referring to FIG. 10, distribution holes 177*a* and 178*a* may be formed in surfaces of the first connection pipe 177 and the second connection pipe 178 facing an inner surface of the thermal energy storage 160, respectively. A plurality of fourth distribution holes 177*a* may be formed in the first connection pipe 177 while being spaced apart from each other, and a plurality of fifth distribution holes 178*a* may be formed in the second connection pipe 178 while being spaced apart from each other. The fourth distribution holes 177*a* may have the same size as the distribution holes 171*a* to 173*a* formed in the first region of the upper distributor 170, and the fifth distribution holes 178*a* may have the same size as the distribution holes 171*b* to 173*b* formed in the second region of the upper distributor 170. Water supplied from the fourth distribution holes 177*a* and the fifth distribution holes 178*a* may reach the central region C of the thermal energy storage 160 at the same velocity as the water supplied from the first to third distribution pipes 174 to 176.

The thermal energy storage 160, the upper distributor 170, and the lower distributor 180 having the above structure may be coupled to each other to form one thermal energy storage module #1, #2, #3, . . . , and a plurality of thermal energy storage modules #1, #2, #3, . . . may be provided. The thermal energy storage modules #1, #2, #3, may be arranged in parallel with each other.

The first supply line 190 may have one end connected to the circulation line 110 at a first point P1, which is a section between the freezer 120 and the second pump 150, and an opposite end connected to the lower pipe 189. According to the embodiment, the opposite end of the first supply line 190 may be branched into lines having a number corresponding to a number of the thermal energy storage modules #1, #2, #3, . . . , so that the lines may be connected to lower pipes 189 of the thermal energy storage modules #1, #2, #3, . . . , respectively.

The second supply line 200 may have one end connected to the circulation line 110 at a second point P2, which is a section between the air conditioner 130 and the first pump 140, and an opposite end connected to the upper pipe 179. According to the embodiment, the opposite end of the second supply line 200 may be branched into lines having a number corresponding to the number of the thermal energy storage modules #1, #2, #3, . . . , so that the lines may be connected to upper pipes 179 of the thermal energy storage modules #1, #2, #3, . . . , respectively.

The third supply line 210 may have one end connected to the circulation line 110 at a third point P3, which is a section between the second pump 150 and the first point P1, and an opposite end connected to the second supply line 200.

The fourth supply line 220 may have one end connected to the circulation line 110 at a fourth point P4, which is a section between the freezer 120 and the first point P1, and an opposite end connected to the second supply line 200.

The fifth supply line 230 may have one end connected to the circulation line 110 at a fifth point P5, which is a section between the fourth point P4 and the freezer 120, and an opposite end connected to the circulation line 110 at a sixth point P6, which is a section between the second point P2 and the first pump 140.

The first valve 240 may be installed on the circulation line 110 at a section between the first point P1 and the fourth point P4, the second valve 250 may be installed on the second supply line 200 at a section between the second point P2 and a connection region P7 of the second supply line 200 and the third supply line 210, and the third valve 260 may be installed on the third supply line 210. The fourth valve 270 may be installed on the circulation line 110 at a section between the first point P1 and the third point P3, the fifth valve 280 may be installed on the circulation line 110 at a section between the second point P2 and the sixth point P6, and the sixth valve 290 may be installed on the fourth supply line 220. The seventh valve 300 may be installed on the fifth supply line 230.

The first to sixth valves 240 to 290 may be automation valves in which opening and closing and an opening/closing rate are controlled by electrical signals applied under control of the control unit 320. The seventh valve 300 may be a differential pressure control valve that is opened and closed by a pressure difference between the water introduced into the freezer 120 along the circulation path 110 and the water discharged from the freezer 120.

The auxiliary power supply unit 310 may be a battery capable of storing a predetermined capacity of power, and the auxiliary power supply unit 310 may supply an auxiliary power to the second pump 150 and the first to sixth valves 240 to 290 in an emergency operation mode.

The control unit 320 may control the components described above in a normal operation mode, the emergency operation mode, a temporary operation mode, and a recharging operation mode.

Figure 11:
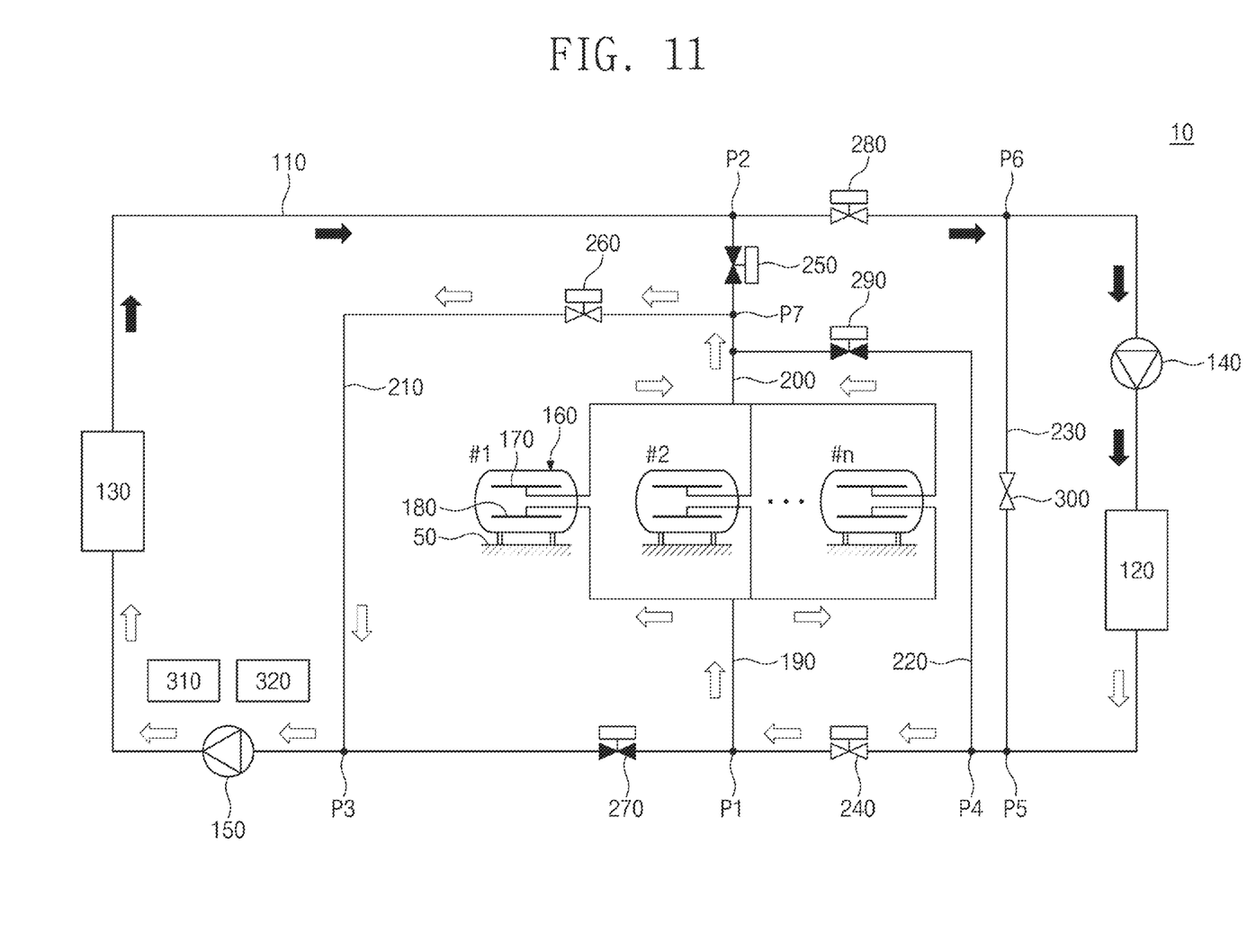
FIG. 11 is a view for describing an operation process of the thermal energy storage system in a normal operation mode.

FIG. 11 is a view for describing an operation process of the thermal energy storage system in a normal operation mode.

Referring to FIG. 11, under the control of the control unit 320, a power may be applied from an external power supply source to the data center, the freezer 120, the first pump 140, the second pump 150, and the first to sixth valves 240 to 290. The freezer 120, the first pump 140, and the second pump 150 may be driven, the first valve 240, the third valve 260, and the fifth valve 280 may be opened, and the second valve 250, the fourth valve 270, and the sixth valve 290 may be closed.

The cold water discharged from the freezer 120 may be supplied to the lower space 160b of the thermal energy storage 160 through the circulation line 110, the first supply line 190, and the lower distributor 180.

The hot water stored in the upper space 160a of the thermal energy storage 160 may be sucked by the upper distributor 170, and supplied to the air conditioner 130 through the second supply line 200, the third supply line 210, and the circulation line 110. A temperature of the hot water that has been subjected to the heat exchange in the air conditioner 130 may be increased. The hot water may be supplied to the freezer 120 through the circulation line 110, and cooled in the freezer 120.

Figure 12:
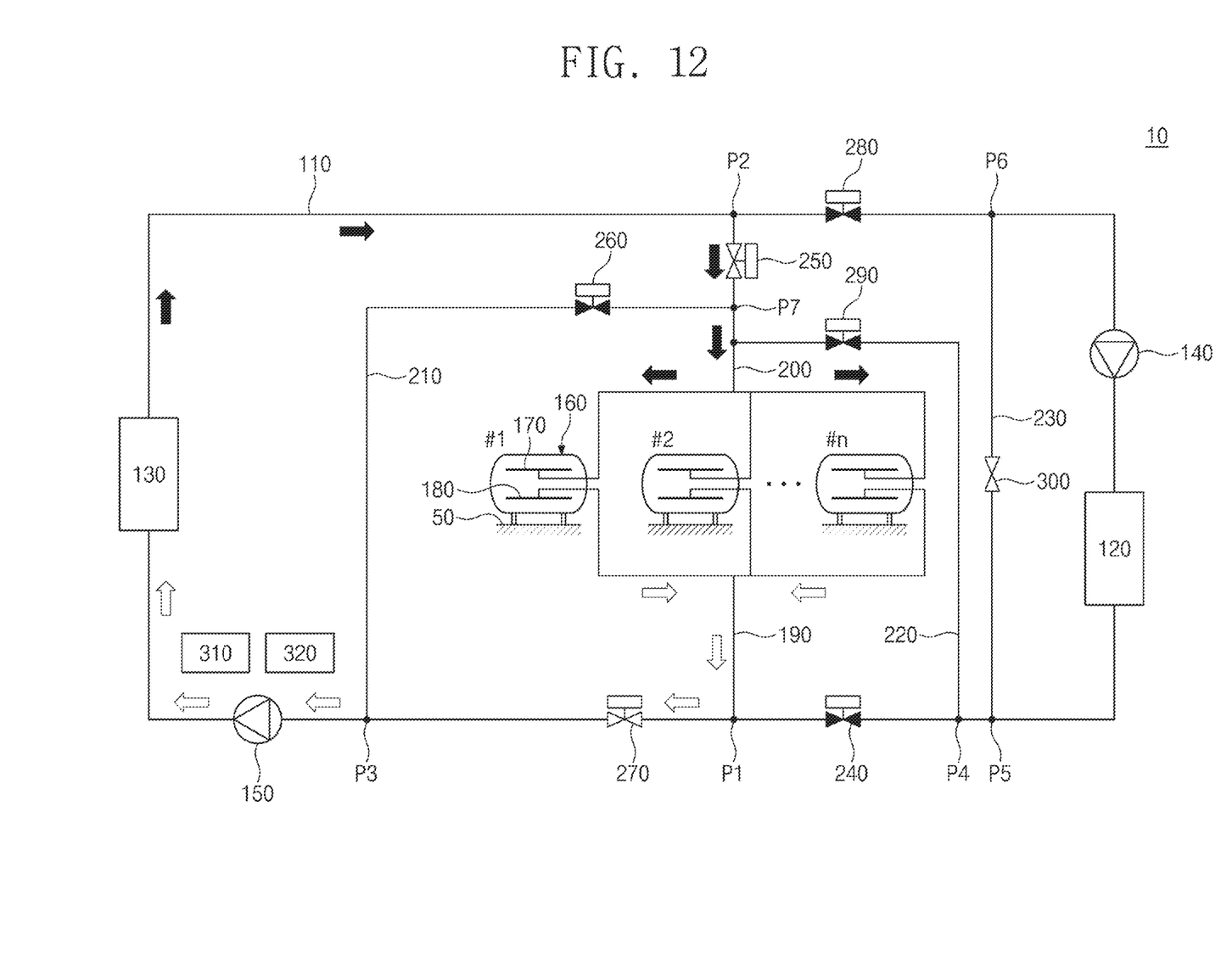
FIG. 12 is a view for describing an operation process of the thermal energy storage system in an emergency operation mode.

FIG. 12 is a view for describing an operation process of the thermal energy storage system in an emergency operation mode.

Referring to FIG. 12, the emergency operation mode refers to a situation in which supply of a power from an external power supply source is cut off, or the supply of the power is not smoothly performed. When the supply of the power is cut off, an operation of the data center may be stopped, and driving of the freezer 120, the first pump 140, the second pump 150, and the first to sixth valves 240 to 290 may be stopped. When the first pump 140 and the second pump 150 are stopped, heat exchange may not occur in the air conditioner 130, so that an internal temperature of the data center may be increased.

In the emergency operation mode, the power stored in the auxiliary power supply unit 310 may be supplied to the second pump 150 and the first to sixth valves 240 to 290 under the control of the control unit 320. Since an amount of power that may be stored in the auxiliary power supply unit 310 is limited, the power may not be supplied to the data center and the freezer 120, which require high power consumption. In addition, the power may also not be supplied to the first pump 140 in order to minimize power consumption.

While the driving of the first pump 140 and the freezer 120 is stopped, the second pump 150 may be driven, the first valve 240, the third valve 260, the fifth valve 280, and the sixth valve 290 may be closed, and the second valve 250 and the fourth valve 270 may be opened. The cold water stored in the lower space 160b of the thermal energy storage 160 may be sucked through the lower distributor 180, and supplied to the air conditioner 130 through the first supply line 190 and the circulation line 110. A temperature of the cold water may be increased as the cold water passes through the air conditioner 130, and the cold water may be supplied to the upper space 160a of the thermal energy storage 160 through the circulation line 110, the second supply line 200, and the upper distributor 170. Due to the circulation of the cold water stored in the thermal energy storage 160, an increase in the temperature of the data center may be suppressed for a predetermined time. The circulation of the water described above may continue until supply of an external power is restored.

Figure 13:
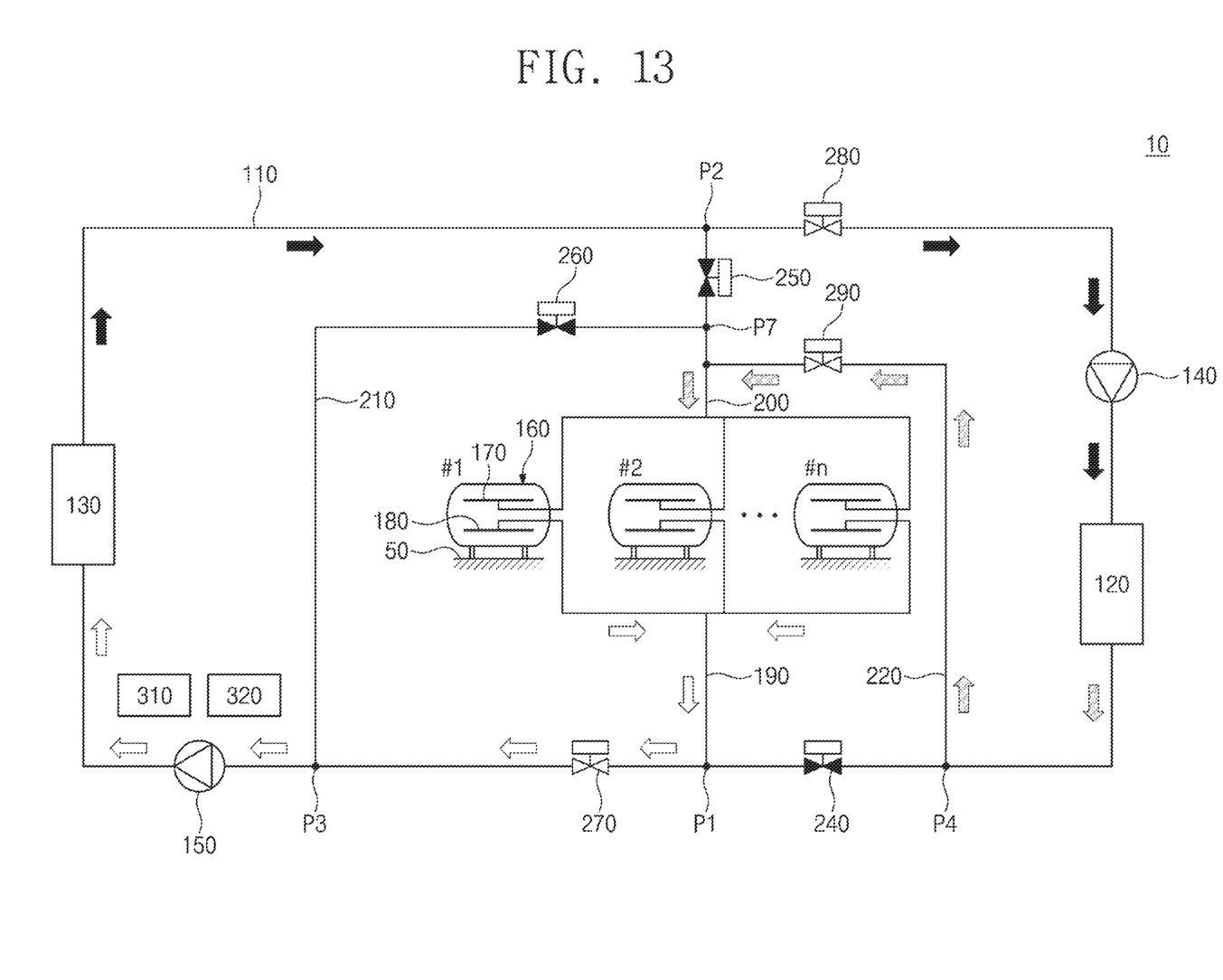
FIG. 13 is a view for describing an operation process of the thermal energy storage system in a temporary operation mode.

FIG. 13 is a view for describing an operation process of the thermal energy storage system in a temporary operation mode.

Referring to FIG. 13, the temporary operation mode refers to an operation mode immediately after terminating the emergency operation mode and before performing the recharging operation mode. Upon an initial operation of the freezer 120 as the external power is restored, the freezer 120 may fail to generate cold water that is sufficiently cooled to a design temperature. When the cold water is directly supplied to the air conditioner 130, an air conditioning temperature may be slightly increased. In order to solve the above problem, in the temporary operation mode, the cold water discharged from the freezer 120 may be supplied to the thermal energy storage 160 without being directly supplied to the air conditioner 130.

In detail, upon an initial stage of the restoration of the external power, the freezer 120, the first pump 140, and the second pump 150 may be driven, the fourth valve 270, the fifth valve 280, and the sixth valve 290 may be opened, and the first valve 240, the second valve 250, and the third valve 260 may be closed. The cold water discharged from the freezer 120 may be supplied to the upper space 160a of the thermal energy storage 160 through the fourth supply line 220, the second supply line 200, and the upper distributor 170. The cold water stored in the lower space 160b of the thermal energy storage 160 may be sucked into the lower distributor 180, and supplied to the air conditioner 130 through the first supply line 190 and the circulation line 110. The water that has passed through the air conditioner 130 may be supplied to the freezer 120 through the circulation line 110. Such circulation of the water may continue until a temperature of the cold water generated by the freezer 120 reaches the design temperature.

Figure 14:
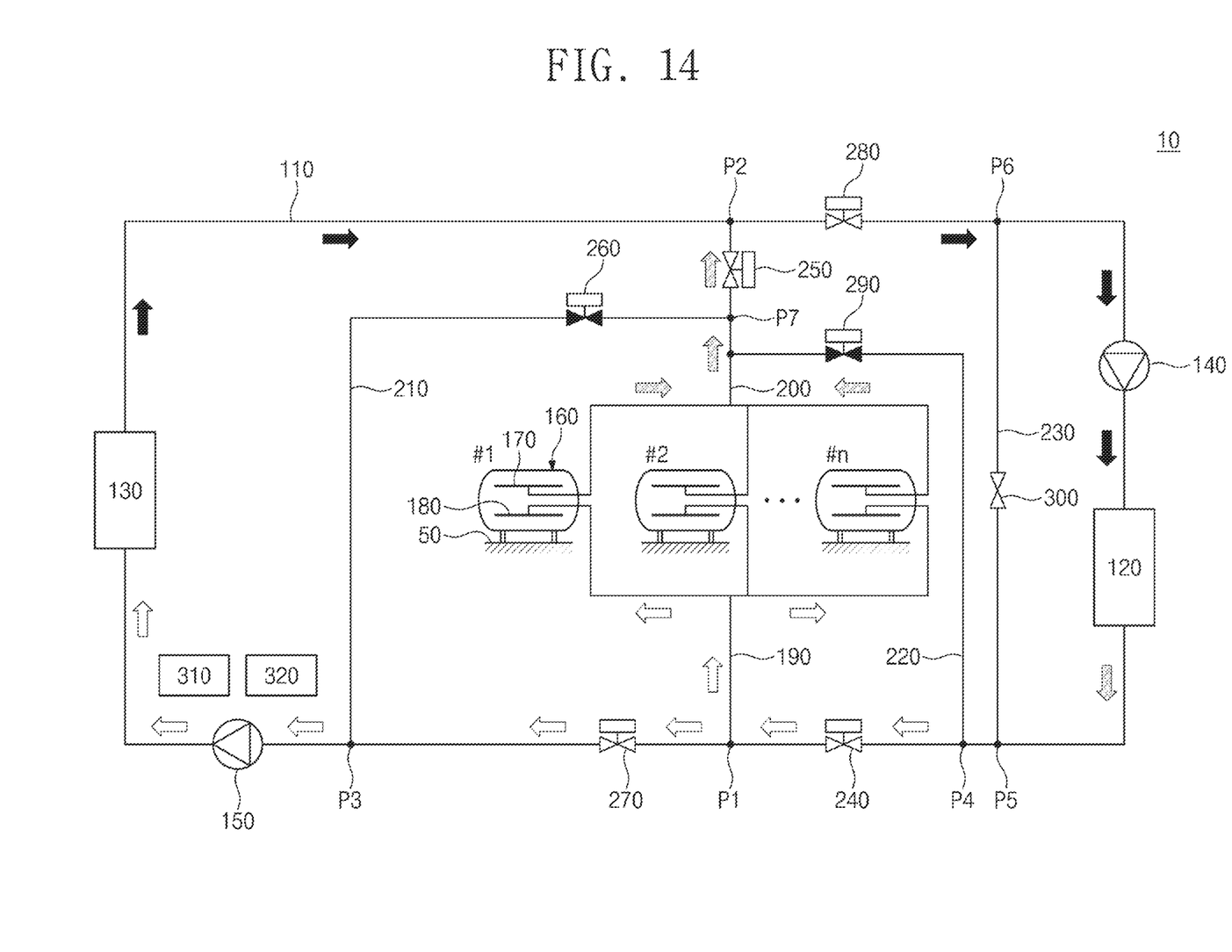
FIG. 14 is a view for describing an operation process of the thermal energy storage system in a recharging operation mode.

FIG. 14 is a view for describing an operation process of the thermal energy storage system in a recharging operation mode.

Referring to FIG. 14, the recharging operation mode refers to an operation process for removing the hot water filled in the thermal energy storage 160 during the emergency operation mode. Under the control of the control unit 320, the freezer 120, the first pump 140, and the second pump 150 may be driven, the first valve 240, the second valve 250, the fourth valve 270, and the fifth valve 280 may be opened, and the third valve 260 and the sixth valve 290 may be closed.

A portion of the cold water that is sufficiently cooled to the design temperature by the freezer 120 may be supplied to the air conditioner 130 through the circulation line 110, and the rest of the cold water may be supplied to the lower space 160b of the thermal energy storage 160 through the first supply line 190 and the lower distributor 180. As the cold water is supplied, the thermal energy storage 160 may be gradually filled with the cold water from the lower space 160b.

The hot water stored in the upper space 160a of the thermal energy storage 160 may be introduced into the upper distributor 170, and supplied to the freezer 120 through the second supply line 200 and the circulation line 110. The hot water may be cooled to the design temperature by the freezer 120.

The above process may continue until the hot water generated in the emergency operation mode is completely removed, and the thermal energy storage 160 is filled up with the cold water having the design temperature, that is, until the cold water and hot water are stratified in the normal operation mode as described above. When the thermal energy storage 160 is filled up with the cold water having the design temperature, an operation mode may be switched again into the normal operation mode.

Although the exemplary embodiments of the present invention have been described in detail above, the scope of the present invention is not limited to a specific embodiment, and shall be interpreted by the appended claims. In addition, it shall be understood by those of ordinary skill in the art that various changes and modifications can be made without departing from the scope of the present invention.

What is claimed is:
1. A thermal energy storage system comprising:
a thermal energy storage having an upper space for storing hot water and having a lower space for storing cold water, wherein the hot water and the cold water are stratified;
an upper distributor located in the upper space and configured to suck the hot water; and
a lower distributor located in the lower space and configured to supply the cold water,
wherein the thermal energy storage includes:
a body having a cylindrical shape and having a central axis arranged in a first axis direction that is parallel to a ground;
a first hemispherical dome part configured to seal a first open side of the body; and
a second hemispherical dome part configured to seal a second open side of the body that is opposite the first open side of the body,
wherein each of the upper distributor and the lower distributor has a predetermined length in the first axis direction,
wherein each of the upper distributor and the lower distributor includes a first region that (a) is adjacent to the first hemispherical dome part, and (b) includes first distribution holes that are formed in a surface of the first region and that face an inner surface of the body,
wherein each of the upper distributor and the lower distributor includes a second region that (a) is adjacent to the second hemispherical dome part, and (b) includes second distribution holes that are formed in a surface of the second region and that face the inner surface of the body,
wherein each of the upper distributor and the lower distributor includes a third region that (a) is located between the first region and the second region, and (b) includes third distribution holes that are formed in a surface of the third region and that face the inner surface of the body, and
wherein each of the first distribution holes formed in the first region, and each of the second distribution holes formed in the second region, have a larger size than one of the third distribution holes formed in the third region.

2. The thermal energy storage system of claim 1, wherein the third distribution holes include:
a central distribution hole;
a first peripheral distribution hole located on one side of the central distribution hole while being spaced apart from the central distribution hole by a first predetermined distance in a second axis direction that is perpendicular to the first axis direction; and a second peripheral distribution hole located on an opposite side of the central distribution hole while being spaced apart from the central distribution hole by a second predetermined distance in the second axis direction, wherein the second peripheral distribution hole and the first peripheral distribution hole each has a larger size than the central distribution hole.

3. A thermal energy storage system comprising:

a thermal energy storage having an upper space for storing hot water and having a lower space for storing cold water, wherein the hot water and the cold water are stratified;

an upper distributor located in the upper space and configured to suck the hot water, the upper distributor having a first predetermined length in a first axis direction that is parallel to a ground; and a lower distributor located in the lower space and configured to supply the cold water, the lower distributor having a second predetermined length in the first axis direction;

wherein each of the upper distributor and the lower distributor includes:

a first distribution pipe having a predetermined first distribution pipe length in the first axis direction, and including first distribution holes formed in a surface of the first distribution pipe;

a second distribution pipe located on one side of the first distribution pipe in a second axis direction that is perpendicular to the first axis direction, arranged parallel to the first distribution pipe, and including second distribution holes formed in a surface of the second distribution pipe;

a third distribution pipe located on an opposite side of the first distribution pipe in the second axis direction, arranged parallel to the first distribution pipe, and including third distribution holes formed in a surface of the third distribution pipe;

a first connection pipe configured to connect a first end of the first distribution pipe to a first end of the third distribution pipe; and a second connection pipe configured to connect a second end of the first distribution pipe to a second end of the third distribution pipe, wherein the first end of the first distribution pipe is opposite the second end of the first distribution pipe, wherein the first end of the third distribution pipe is opposite the second end of the third distribution pipe, wherein the thermal energy storage includes:

a body having a cylindrical shape and having a central axis arranged in the first axis direction;

a first hemispherical dome part configured to seal a first side of the body; and a second hemispherical dome part configured to seal a second side of the body that is opposite the first side of the body, wherein the surface of the first distribution pipe, the surface of the second distribution pipe, and the surface of the third distribution pipe each faces an inner surface of the body, wherein the first connection pipe is adjacent to the first hemispherical dome part, and wherein the second connection pipe is adjacent to the second hemispherical dome part.

4. The thermal energy storage system of claim 3, wherein the second distribution pipe and the third distribution pipe are located at a lower height than the first distribution pipe.

* * * * *